(12) United States Patent
Sugimoto

(10) Patent No.: US 9,578,327 B2
(45) Date of Patent: Feb. 21, 2017

(54) ENCODING APPARATUS, ENCODING METHOD, AND NON-TRANSITORY COMPUTER-READABLE STORAGE MEDIUM

(71) Applicant: CANON KABUSHIKI KAISHA, Tokyo (JP)

(72) Inventor: Shun Sugimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 623 days.

(21) Appl. No.: 13/896,443

(22) Filed: May 17, 2013

(65) Prior Publication Data

US 2013/0322549 A1    Dec. 5, 2013

(30) Foreign Application Priority Data

May 29, 2012  (JP) .................................. 2012-122396

(51) Int. Cl.
*H04N 7/26* (2006.01)
*H04N 19/44* (2014.01)
*H04N 19/597* (2014.01)

(52) U.S. Cl.
CPC ...... *H04N 19/00533* (2013.01); *H04N 19/597* (2014.11)

(58) Field of Classification Search
None
See application file for complete search history.

(56) References Cited

U.S. PATENT DOCUMENTS

| | | | | |
|---|---|---|---|---|
| 2001/0048805 A1* | 12/2001 | Adolph | ................ | G11B 27/105 386/329 |
| 2005/0123056 A1* | 6/2005 | Wang | .................. | H04N 19/573 375/240.25 |
| 2009/0190660 A1* | 7/2009 | Kusakabe | ............ | H04N 19/139 375/240.13 |
| 2009/0213940 A1* | 8/2009 | Steinbach | ............ | H04N 19/176 375/240.27 |
| 2010/0128791 A1* | 5/2010 | Le Floch | ............. | H04N 19/139 375/240.16 |
| 2010/0150248 A1* | 6/2010 | Pandit | ................ | H04N 13/0282 375/240.25 |
| 2011/0176613 A1* | 7/2011 | Tsai | ....................... | H04N 19/56 375/240.16 |
| 2011/0286531 A1* | 11/2011 | Okajima | .............. | H04N 19/597 375/240.25 |

(Continued)

FOREIGN PATENT DOCUMENTS

| | | |
|---|---|---|
| JP | H07-193821 A | 7/1995 |
| JP | 2009-523356 A | 6/2009 |

(Continued)

*Primary Examiner* — Frederick Bailey
(74) *Attorney, Agent, or Firm* — Carter, DeLuca, Farrell & Schmidt, LLP

(57) ABSTRACT

An encoding apparatus for encoding video data captured by a plurality of imaging units by a predetermined data unit, includes an encoding unit configured to refer to a first data unit included in video data captured by a first imaging unit to encode a second data unit included in the video data captured by the first imaging unit, and refer to a third data unit included in video data captured by a second imaging unit to encode a fourth data unit included in the video data captured by the first imaging unit.

17 Claims, 10 Drawing Sheets

(56) References Cited

U.S. PATENT DOCUMENTS

| | | | | |
|---|---|---|---|---|
| 2012/0008681 A1* | 1/2012 | Lundin | ................ | H04N 19/895 |
| | | | | 375/240.12 |
| 2012/0062756 A1* | 3/2012 | Tian | .................... | H04N 19/008 |
| | | | | 348/218.1 |
| 2012/0275518 A1* | 11/2012 | Kadono | ................. | H04N 19/61 |
| | | | | 375/240.14 |

FOREIGN PATENT DOCUMENTS

| | | | |
|---|---|---|---|
| JP | 2009-272684 A | 11/2009 |
| JP | 2009-278188 A | 11/2009 |
| JP | 2010-506530 A | 2/2010 |
| WO | 2008/044889 A | 4/2008 |

\* cited by examiner

F I G. 1
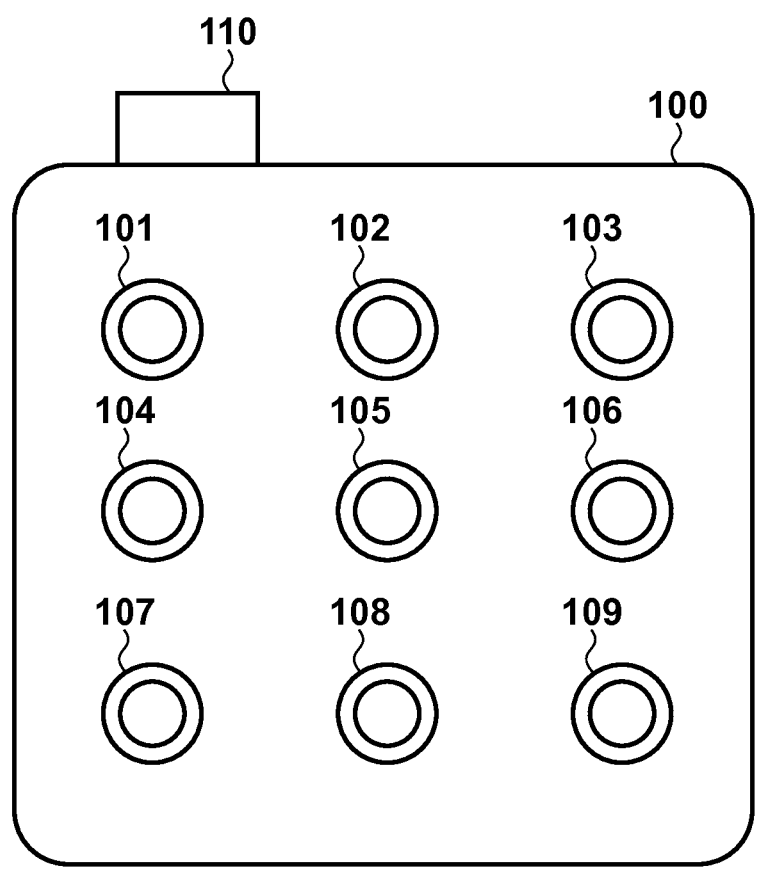

ENCODING APPARATUS, ENCODING METHOD, AND NON-TRANSITORY COMPUTER-READABLE STORAGE MEDIUM

BACKGROUND OF THE INVENTION

Field of the Invention

The present invention relates to an encoding apparatus, an encoding method, and a non-transitory computer-readable storage medium.

Description of the Related Art

H.264/MVC (Multi-view Video Coding) is known as a technique for encoding multi-viewpoint video data. According to H.264/MVC, it is possible to efficiently compress video data by not only referring to another frame captured by the same imaging unit (motion prediction) but also referring to a frame captured at another viewpoint (parallax prediction).

Video transmission using an IP (Internet Protocol) network such as the Internet has become widespread. RTP (A Transport Protocol for Real-Time Application, RFC 3550, IETF) as a protocol for transmitting encoded data of audio or a moving image in real time has been used for such video transmission. RTP assumes the use of UDP (User Datagram Protocol) with a high transfer rate in the transport layer. Although the transfer rate of UDP is high, UDP has no solution to a packet loss or does not ensure a transmission time. It is, therefore, necessary to deal with a communication error in a layer higher than UDP. If an error occurs in a video data packet encoded by not only referring to other frames but also referring to frames captured at other viewpoints, disturbance in the video due to the error propagates in the time direction at other viewpoints.

Japanese Patent Laid-Open No. 2010-506530 discloses, as a method of preventing error propagation, an intra-refresh technique of periodically inserting an intra-prediction encoded intra-frame, and a technique of alternately applying the intra-refresh technique to videos of a plurality of viewpoints.

In the technique described in Japanese Patent Laid-Open No. 2010-506530, however, if an error occurs in the first half of a cycle in which an intra-frame is inserted, it is impossible to recover from video disturbance due to error propagation for a long time.

There is provided a method of shortening the cycle to frequently insert an intra-frame in order to quickly recover from video disturbance due to error propagation. However, with this method, the data amount of the intra-frame is large, and frequent insertion of such intra-frame increases the transmission data amount. This, therefore, causes a further packet loss due to network congestion.

The present invention provides a multi-viewpoint video data encoding technique which allows early recovery from error propagation. Alternatively, the present invention provides a multi-viewpoint video data encoding technique which enables to reduce the transmission data amount.

SUMMARY OF THE INVENTION

According to one aspect of the present invention, there is provided an encoding apparatus for encoding video data captured by a plurality of imaging units by a predetermined data unit, comprising: an encoding unit configured to refer to a first data unit included in video data captured by a first imaging unit to encode a second data unit included in the video data captured by the first imaging unit, and refer to a third data unit included in video data captured by a second imaging unit to encode a fourth data unit included in the video data captured by the first imaging unit; an output unit configured to output the encoded video data to a decoding apparatus; a specifying unit configured to specify a specific data unit of the data units of the encoded video data based on an output quality of the video data from the output unit; and a control unit configured to control the encoding unit to encode the data unit so that the decoding apparatus is capable of decoding the data unit without using the specific data unit.

Further features of the present invention will become apparent from the following description of exemplary embodiments (with reference to the attached drawings).

BRIEF DESCRIPTION OF THE DRAWINGS

FIG. 1 is a view exemplifying an image capturing apparatus which adopts a camera array method and includes a plurality of imaging units;

DESCRIPTION OF THE EMBODIMENTS

Exemplary embodiments of the present invention will be described in detail below with reference to the accompanying drawings. Note that components described in the embodiments are merely examples. The technical scope of the present invention is determined by the scope of claims and is not limited by the following individual embodiments.

[First Embodiment]

FIG. 1 is a view exemplifying an image capturing apparatus which adopts a camera array method and includes a plurality of imaging units. The housing of an image capturing apparatus 100 includes nine imaging units 101 to 109 for respectively obtaining (capturing) color videos, and a shutter button 110. The nine imaging units are arranged at regular intervals in the vertical and horizontal directions in a square grid pattern.

When the user presses the shutter button 110, the imaging units 101 to 109 receive optical information of an object by corresponding sensors (image sensors), and the received signals are A/D converted, thereby simultaneously obtaining a plurality of color videos (digital data). Such an image capturing apparatus adopting a camera array method can obtain a plurality of color videos by capturing one single object at a plurality of different viewpoint positions. Note that although the number of imaging units is nine, the present invention is not limited to this. The present invention is applicable as long as the image capturing apparatus includes a plurality (N≥2: N is an integer) of imaging units.

Although a case in which the nine imaging units are arranged at regular intervals in the square grid pattern has been explained with reference to FIG. 1, the imaging units may be arbitrarily arranged. For example, the imaging units may be radially, linearly, or randomly arranged.

Figure 2:
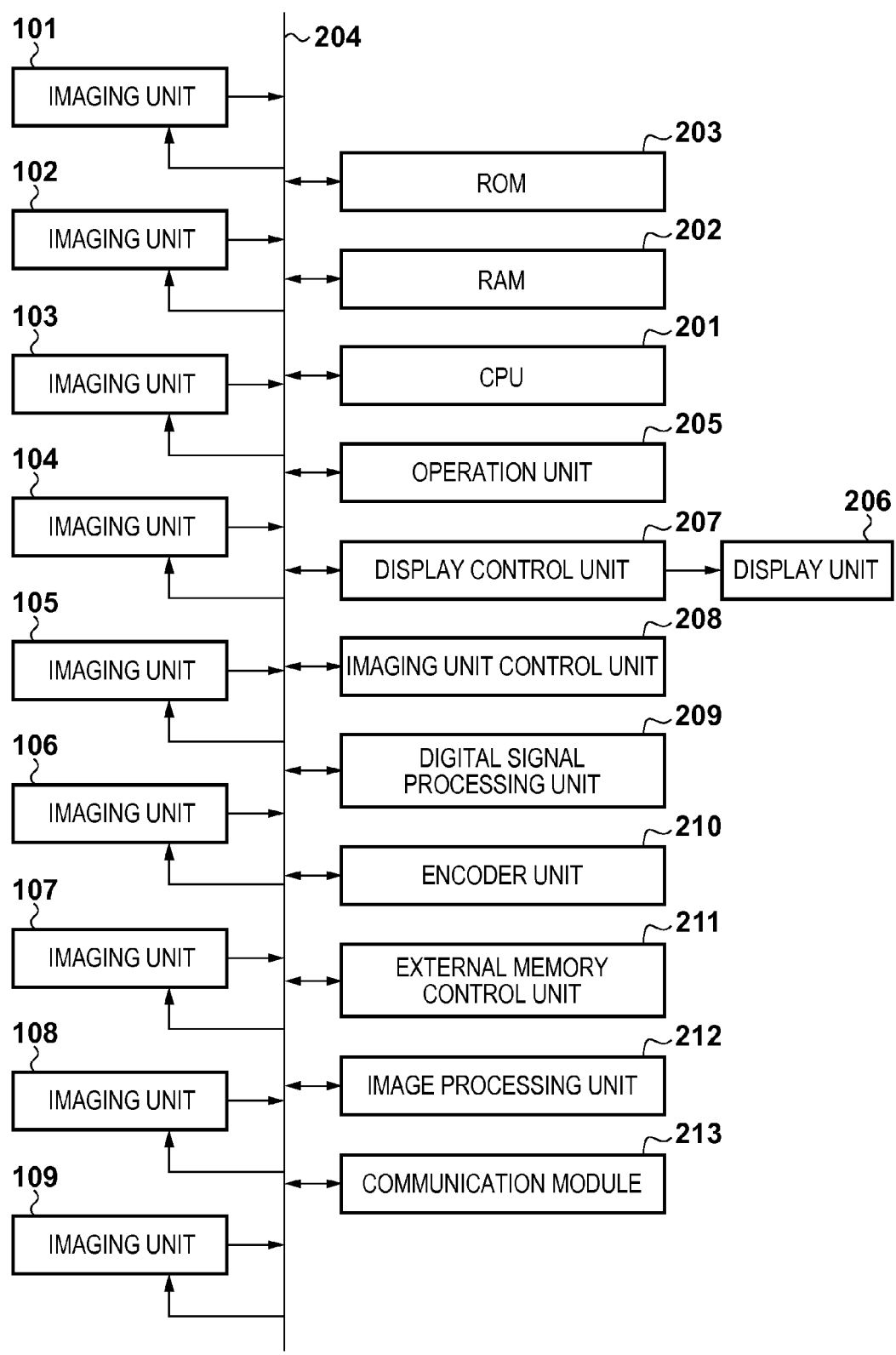
FIG. 2 is a block diagram exemplifying the internal arrangement of the image capturing apparatus adopting a camera array method.

FIG. 2 is a block diagram exemplifying the internal arrangement of the image capturing apparatus 100 adopting a camera array method. A central processing unit (CPU) 201 collectively controls each component (to be described below). A RAM 202 functions as a main memory, a work area, or the like for the central processing unit (CPU) 201. A ROM 203 stores control programs and the like to be executed by the central processing unit (CPU) 201. A bus 204 functions as the transfer path of various data. For example, a plurality of color videos (digital data) obtained by the imaging units 101 to 109 are sent to a predetermined processing unit via the bus 204.

An operation unit 205 accepts an instruction from the user. The operation unit 205 includes, for example, buttons and a mode dial. A display unit 206 displays a captured video or characters. For example, a liquid crystal display is used as the display unit 206. The display unit 206 may have a touch screen function. In this case, it is possible to process, as an input to the operation unit 205, an instruction given by the user using the touch screen. A display control unit 207 controls display of a captured image or characters displayed on the display unit 206.

Based on an instruction from the CPU 201, an imaging unit control unit 208 controls the operation of each imaging unit such as focusing, opening or closing of a shutter, or adjustment of a stop. A digital signal processing unit 209 executes various processes such as white balance processing, gamma processing, and noise reduction processing for digital data received via the bus 204.

An encoder unit 210 executes processing of converting digital data according to a specific encoding scheme. In this embodiment, H.264/MVC will be described as an example of an encoding scheme. An applicable encoding scheme, however, is not limited to this, and an encoding scheme other than H.264/MVC may be used. The encoder unit 210 also performs processing of dynamically controlling the encoding mode of video data and a reference direction in encoding based on a negative acknowledgement sent from the reception apparatus which receives video data. Furthermore, the encoder unit 210 includes a packetizer for packetizing transmission data to have a size and format appropriate for a network, and a de-packetizer for obtaining the payload of a packet received from the network. Details of the encoder unit 210 will be described later.

An encoding apparatus according to this embodiment encodes the video data captured by the plurality of imaging units by a predetermined data unit (to be referred to as an encoding unit region hereinafter).

An external memory control unit 211 serves as an interface for connecting to an information processing apparatus (PC) or another medium (for example, a hard disk, memory card, CF card, SD card, or USB memory). An image processing unit 212 executes image processing using a color video group obtained by the imaging units 101 to 109 or a color video group output from the digital signal processing unit 209.

A communication module 213 provides a communication function with the Internet, public wireless network, or LAN (Local Area Network). The communication module 213 outputs encoded video data to a decoding apparatus. The communication function of the communication module 213 enables to externally transmit the encoded data obtained by encoding captured video data, and externally obtain various kinds of information. The interface of the communication module 213 may be a wired or wireless interface, and an arbitrary protocol can be used. The communication module 213 will be described in detail in the second embodiment.

Figure 3:
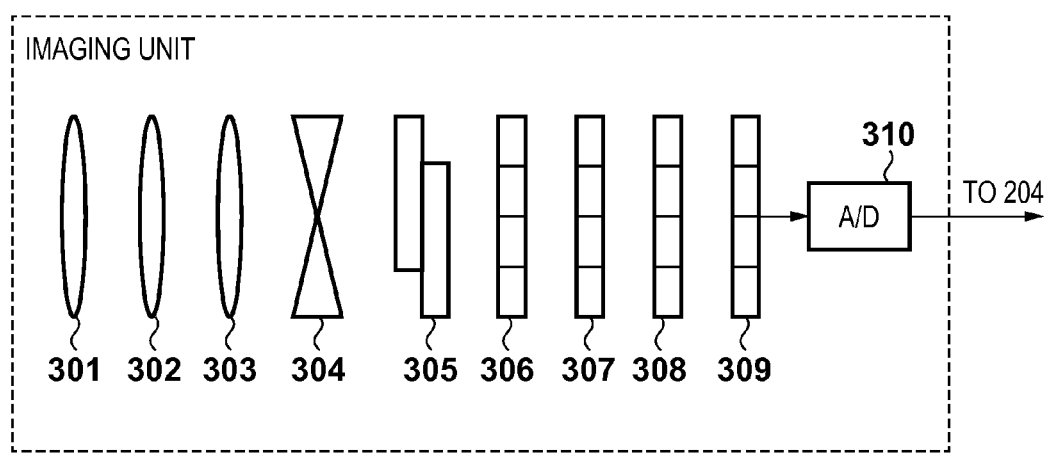
FIG. 3 is a view exemplifying the internal arrangement of the imaging unit.

FIG. 3 is a view exemplifying the internal arrangement of each of the imaging units 101 to 109.

Each of the imaging units 101 to 109 includes a zoom lens 301, a focus lens 302, and a blur correction lens 303. Furthermore, each of the imaging units 101 to 109 includes a stop 304, a shutter 305, an optical low-pass filter 306, an iR cut filter 307, a color filter 308, a sensor 309, and an A/D conversion unit 310. The sensor 309 is, for example, a CMOS or CCD sensor. The sensor 309 detects the amount of light of an object, and the A/D conversion unit 310 converts the detected light amount into a digital value, thereby outputting it as digital data to the bus 204.

Figure 4:
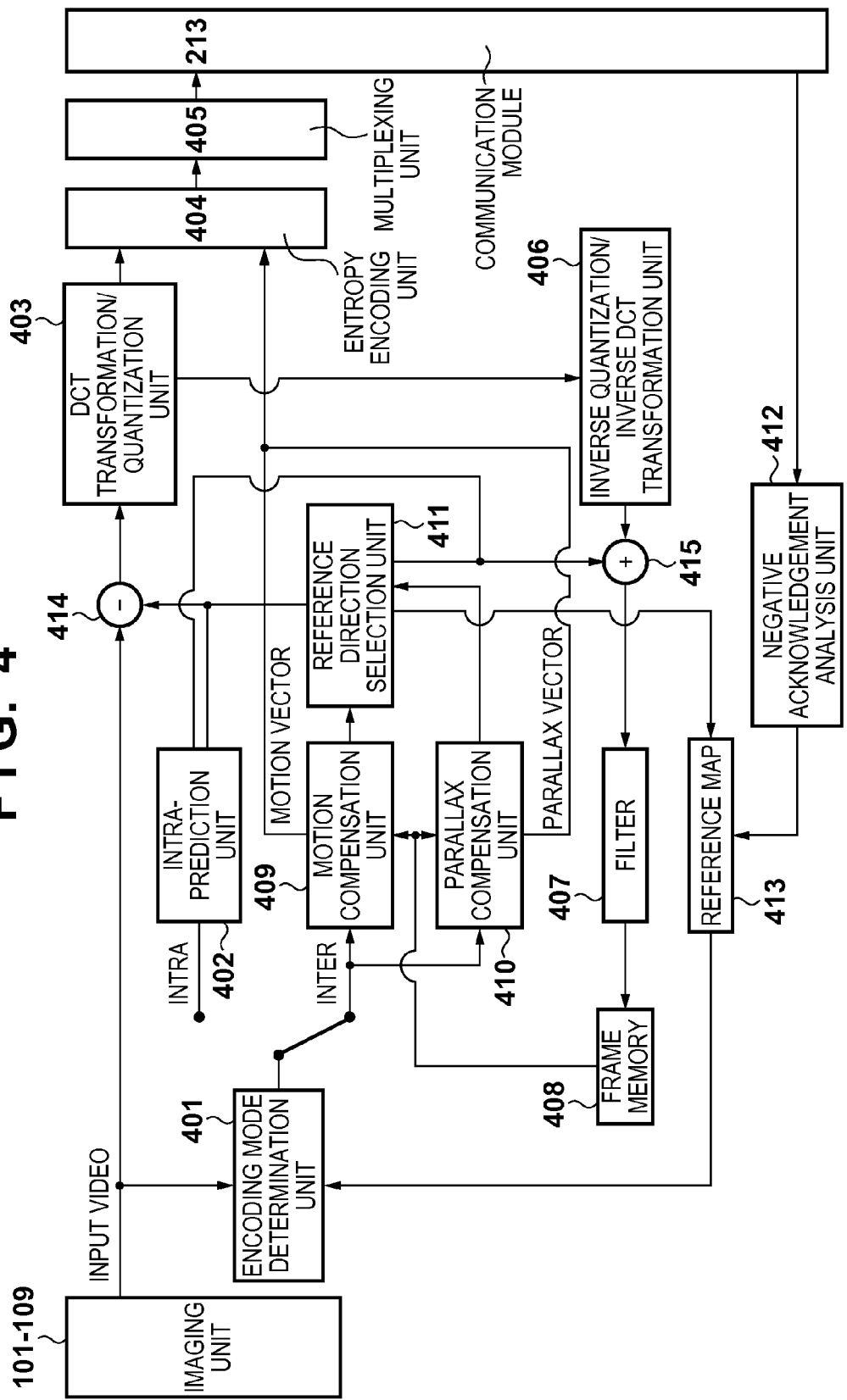
FIG. 4 is a view showing the internal arrangement of an encoder unit.

FIG. 4 is a view showing the internal arrangement of the encoder unit 210. The encoder unit 210 has a function of receiving, as video data, color videos (digital data) captured by the imaging units 101 to 109, and outputting encoded data obtained by encoding the video data to the communication module 213. Although one encoder unit 210 encodes the color videos as multi-viewpoint video data in this embodiment, a plurality of encoder units can encode a plurality of color videos captured by the imaging units 101 to 109. Alternatively, an encoder unit for encoding a color video (digital data) may exist for each image capturing apparatus. An encoder unit may be configured to encode a multi-viewpoint video by separating it into a video at one basic viewpoint position (basic viewpoint) of a plurality of viewpoint positions and videos at viewpoint positions other than the basic viewpoint.

When encoding an encoding unit region (for example, a frame, slice, or macroblock) of video data, an encoding mode determination unit 401 determines the presence/absence of another referable encoding unit region of the video data using a reference map. The encoding mode of the input video data is determined. The encoding mode can include an intra mode in which video data to be encoded is encoded within an encoding unit region, and an inter mode in which video data is encoded by referring to another encoding unit region. As an encoding determination condition, the encoding mode determination unit 401 determines encoding by the intra mode if encoding within an encoding unit region is periodically performed for video data at the basic viewpoint. Furthermore, as an encoding determination condition, if there is no other referable encoding unit region of the video data in a reference map 413, the encoding mode determination unit 401 determines encoding by the intra mode. If this encoding determination condition is not satisfied, the encoding mode determination unit 401 determines encoding by the inter mode. Details of the encoding mode determination unit 401 will be described later. Note that in the following description of the internal arrangement of the encoder unit 210, a frame will be explained as an example of the encoding unit region.

If the encoding mode determination unit 401 determines the intra mode, an intra-prediction unit 402 (intra mode encoding unit) generates an intra-prediction signal based on input video data. The generated intra-prediction signal is input to a subtracter 414. The subtracter 414 inputs, to a DCT (Discrete Cosine Transform) transformation/quantization unit 403, remainder data obtained by subtracting the intra-prediction signal from the video data input by the imaging unit.

The DCT transformation/quantization unit 403 DCT-transforms and quantizes the remainder data input by the subtracter 414, and inputs the DCT-transformed and quantized data (DCT-transformed/quantized data) to an entropy encoding unit 404. Simultaneously with the input operation to the entropy encoding unit 404, the DCT transformation/quantization unit 403 also inputs, to an inverse quantization/inverse DCT transformation unit 406, the data (DCT-transformed/quantized data) obtained by DCT-transforming and quantizing the remainder data.

The entropy encoding unit 404 executes variable-length encoding processing for the DCT-transformed/quantized data, and inputs the DCT-transformed/quantized data having undergone the variable-length encoding processing to a multiplexing unit 405. The DCT-transformed/quantized data having undergone the variable-length encoding processing is multiplexed by the multiplexing unit 405, and packetized to have a size and format appropriate for the network. The packetized video data packets are input to the communication module 213.

The inverse quantization/inverse DCT transformation unit 406 inverse quantizes and inverse DCT-transforms the input DCT-transformed/quantized data, and inputs the inverse quantized and inverse DCT-transformed data (inverse quantized/inverse DCT-transformed data) to an adder 415. The adder 415 adds the inverse quantized and inverse DCT-transformed data to the intra-prediction signal generated by the intra-prediction unit 402 to restore an intra-frame, and inputs the restored intra-frame to a filter 407.

The deblocking filter of the filter 407 removes block distortion from the intra-frame restored by the adder 415, and the resultant intra-frame is saved in a frame memory 408.

The role of each block when the encoding mode determination unit 401 determines the inter mode will be described next. If the encoding mode determination unit 401 determines the inter mode, the video data input by the imaging units are input to at least one of a motion compensation unit 409 and parallax compensation unit 410. Note that the motion compensation unit 409 and parallax compensation unit 410 form an inter mode encoding unit for encoding video data by referring to another encoding unit region (for example, a frame, slice, or macroblock). If it is possible to perform both motion compensation and parallax compensation by the reference map 413, the video data are input to the motion compensation unit 409 and parallax compensation unit 410.

The motion compensation unit 409 (motion compensation prediction encoding unit) performs motion compensation prediction encoding by referring to an encoding unit region with a different image capturing time at the same viewpoint. The motion compensation unit 409 obtains referable data from the frame memory 408, thereby performing encoding. As described above, with reference to a first encoding unit region included in video data captured by a first imaging unit, a second encoding unit region included in the video data captured by the first imaging unit is encoded. For example, with reference to the first encoding unit region included in the video data captured by the first imaging unit, the second encoding unit region which is included in the video data captured by the first imaging unit and has an image capturing time different from that of the first encoding unit region is encoded. The parallax compensation unit 410 (parallax compensation prediction encoding unit) performs parallax compensation prediction encoding by referring to an encoding unit region with the same time at a different viewpoint. The parallax compensation unit 410 obtains referable data from the frame memory 408, thereby performing encoding. As described above, with reference to a third encoding unit region included in video data captured by a second imaging unit, a fourth encoding unit region included in the video data captured by the first imaging unit is encoded. For example, with reference to the third encoding unit region included in the video data captured by the second imaging unit, the fourth encoding unit region which is included in the video data captured by the first imaging unit and has been captured at an image capturing time corresponding to that of the third encoding unit region is encoded.

The motion compensation unit 409 inputs a motion vector obtained by motion compensation to the entropy encoding unit 404 simultaneous to inputting a generated prediction signal (prediction information) to a reference direction selection unit 411. Furthermore, simultaneously with inputting a generated prediction signal (prediction information) to the reference direction selection unit 411, the parallax compensation unit 410 inputs a parallax vector obtained by parallax compensation to the entropy encoding unit 404.

The reference direction selection unit 411 uses the prediction information to generate the reference map 413 defining the relationship between encoding unit regions, which indicates enabling/disabling of reference to another encoding unit region (frame, slice, or macroblock) when encoding the video data. The reference direction selection unit 411 selects a reference direction based on the prediction signal input by the motion compensation unit 409 or parallax compensation unit 410. In this embodiment, a method of selecting a prediction signal with a smaller difference is adopted. As described above, it is possible to decide which of the first encoding unit region captured by the first imaging unit and the second encoding unit region captured by the second imaging unit is referred to when the encoding unit encodes the third data unit captured by the first imaging unit. That is, this decision processing is performed based on the data difference between the third data unit and the first data unit and that between the third data unit and the second data unit.

Alternatively, some encoding methods can use both the prediction signals input by the motion compensation unit 409 and parallax compensation unit 410. If the reference direction selection unit 411 obtains the prediction signal from only one of the motion compensation unit 409 and parallax compensation unit 410, it selects the obtained prediction signal. The reference direction selection unit 411 inputs the selected prediction signal to the subtracter 414. Similarly to the intra mode, the subtracter 414 inputs, to the DCT transformation/quantization unit 403, remainder data obtained by subtracting the prediction signal input by the reference direction selection unit 411 from the video data input by the imaging unit.

The processing of the DCT transformation/quantization unit 403, entropy encoding unit 404, multiplexing unit 405, and inverse quantization/inverse DCT transformation unit 406 for the remainder data is the same as that for the intra mode.

Simultaneously with inputting the prediction signal to the subtracter 414, the reference direction selection unit 411 also inputs the prediction signal to the adder 415.

The adder 415 adds the data (inverse quantized/inverse DCT-transformed data) inverse quantized and inverse DCT-transformed by the inverse quantization/inverse DCT transformation unit 406 to the prediction signal input by the reference direction selection unit 411, thereby restoring an inter-frame. The adder 415 then inputs the restored inter-frame to the filter 407. The deblocking filter of the filter 407 removes block distortion from the inter-frame restored by the adder 415, and the resultant inter-frame is saved in the frame memory 408.

A negative acknowledgement analysis unit 412 will now be described. The negative acknowledgement analysis unit 412 obtains a negative acknowledgement from the communication module 213. The negative acknowledgement is a response message including information of video data which could not be decoded due to some error from the reception apparatus as the transmission destination of the packets of the video data. In this way, a response indicating an encoding unit region, among the encoding unit regions of the video data output from the communication module 213, which was not decoded by the decoding apparatus is received from the decoding apparatus.

Information for identifying video data which could not be decoded includes an encoding unit region which could not be decoded, for example, a frame number for identifying a frame, identification information (slice number) for identifying a slice within a frame, or identification information for identifying a macroblock. The information for identifying video data which could not be decoded corresponds to an encoding unit region (for example, a frame, slice, or macroblock) of the video data managed by the reference map 413.

For a frame, for example, the negative acknowledgement analysis unit 412 can specify the position of an error encoding unit region in the reference map 413 using the identification information. The negative acknowledgement analysis unit 412 generates error information for changing the relationship between the encoding unit regions so that reference from the error encoding unit region cannot be made when encoding the video data later. The relationship between the encoding unit regions includes reference, in the time direction, to video data with different image capturing times at the same viewpoint (motion compensation) and reference, in the parallax direction, to video data with the same time at different viewpoints (parallax compensation). The relationship between the encoding unit regions also includes reference to only the self encoding unit region without referring to other encoding unit regions in either the time direction or the parallax direction. As described above, a specific encoding unit region among the encoding unit regions of the encoded video data is specified based on the output quality of the video data from the communication module 213.

In performing encoding by reference in the time direction (motion compensation) and reference in the parallax direction (parallax compensation), if encoding by motion compensation is impossible due to an error, the relationship between the encoding unit regions is changed so that only reference in the parallax direction is enabled. On the other hand, in performing encoding by reference in the time direction (motion compensation) and reference in the parallax direction (parallax compensation), if parallax compensation cannot be performed due to an error, the relationship between the encoding unit regions is changed so that only reference in the time direction is enabled.

Alternatively, in performing inter-encoding by reference in the time direction or reference in the parallax direction, if it is impossible to refer to another encoding unit region due to an error, switching to intra-encoding by reference to only the self encoding unit region is included.

The negative acknowledgement analysis unit 412 reflects, in the reference map 413, the error information obtained by analyzing the video data which could not be decoded, thereby changing the relationship between the encoding unit regions in the reference map 413.

Figure 5:
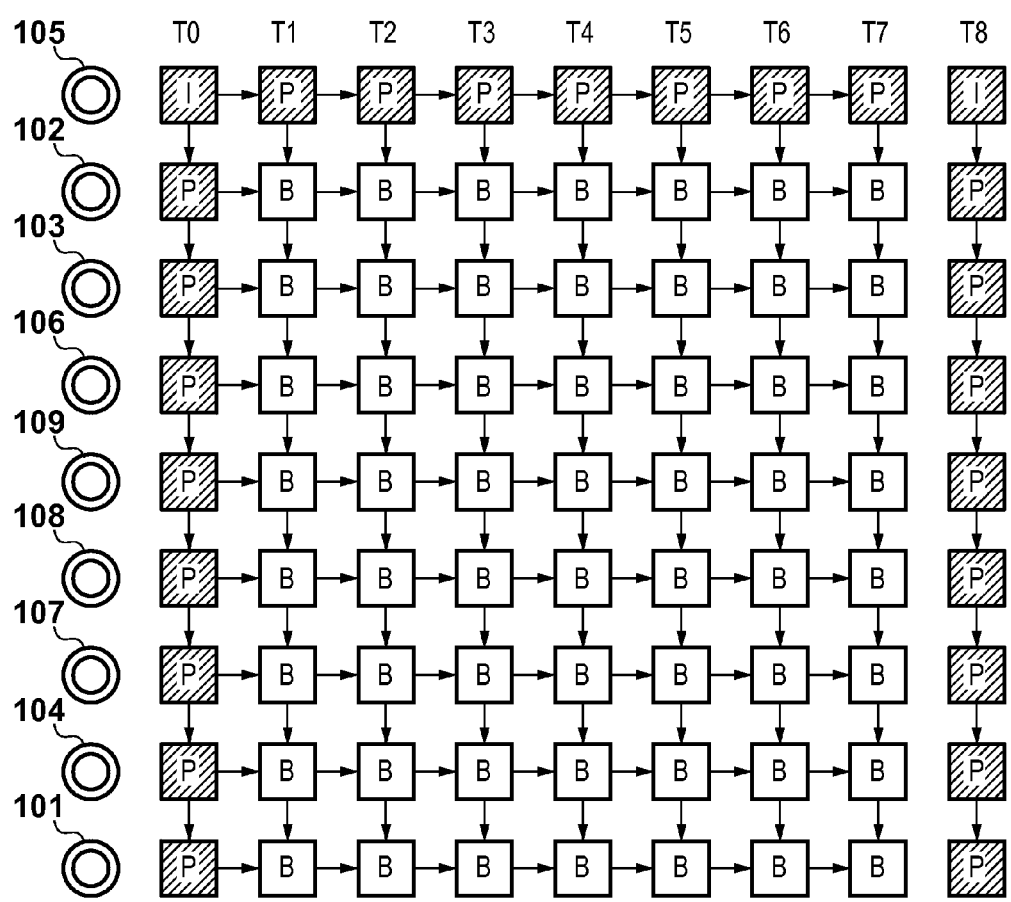
FIG. 5 is a schematic view showing a reference map.

FIG. 5 is a schematic view showing the reference map 413. Although the reference map 413 is formed by frames as encoding unit regions in this embodiment, it may be formed by slices or macroblocks. In the following description, a frame will be exemplified as the encoding unit region. The ordinate direction represents the imaging units 101 to 109 with different parallaxes (reference in the parallax direction), and reference symbols T0 to T8 in the abscissa direction represent the time axis (reference in the time direction). In this embodiment, the central imaging unit 105 of the nine imaging units of the image capturing apparatus shown in FIG. 1 is set as the basic viewpoint. Another imaging unit, however, may be set as the basic viewpoint.

In FIG. 5, each rectangular block represents a frame, and each arrow indicates a reference direction in encoding. A letter "I" within a rectangular block represents an intra-frame by only intra-encoding. For the I frame, intra-encoding by referring to only the self frame is performed without referring to another frame.

A letter "P" within a rectangular block represents an inter-frame encoded by reference in one direction. For the P frame, reference, in the time direction, to video data with different image capturing times at the same viewpoint (motion compensation) or reference, in the parallax direction, to video data with the same time at different viewpoints (parallax compensation) is made.

A letter "B" within a rectangular block represents an inter-frame encoded by reference in two or more directions. For the B frame, reference, in the time direction, to video data with different image capturing times at the same viewpoint (motion compensation) and reference, in the parallax direction, to video data with the same time at different viewpoints (parallax compensation) are made.

The encoding reference direction shown in FIG. 5 is merely an example, and the present invention is not limited to this. Although a cycle in which an intra-frame (I frame) is inserted is 8 in this embodiment, the present invention is not limited to this. It is possible to reduce the transmission data amount by periodically inserting an intra-frame without inserting any redundant intra-frame. As described above, processing of encoding a data unit included in video data captured by a predetermined one of the plurality of imaging units without referring to another data unit is executed in a predetermined cycle.

Figure 6:
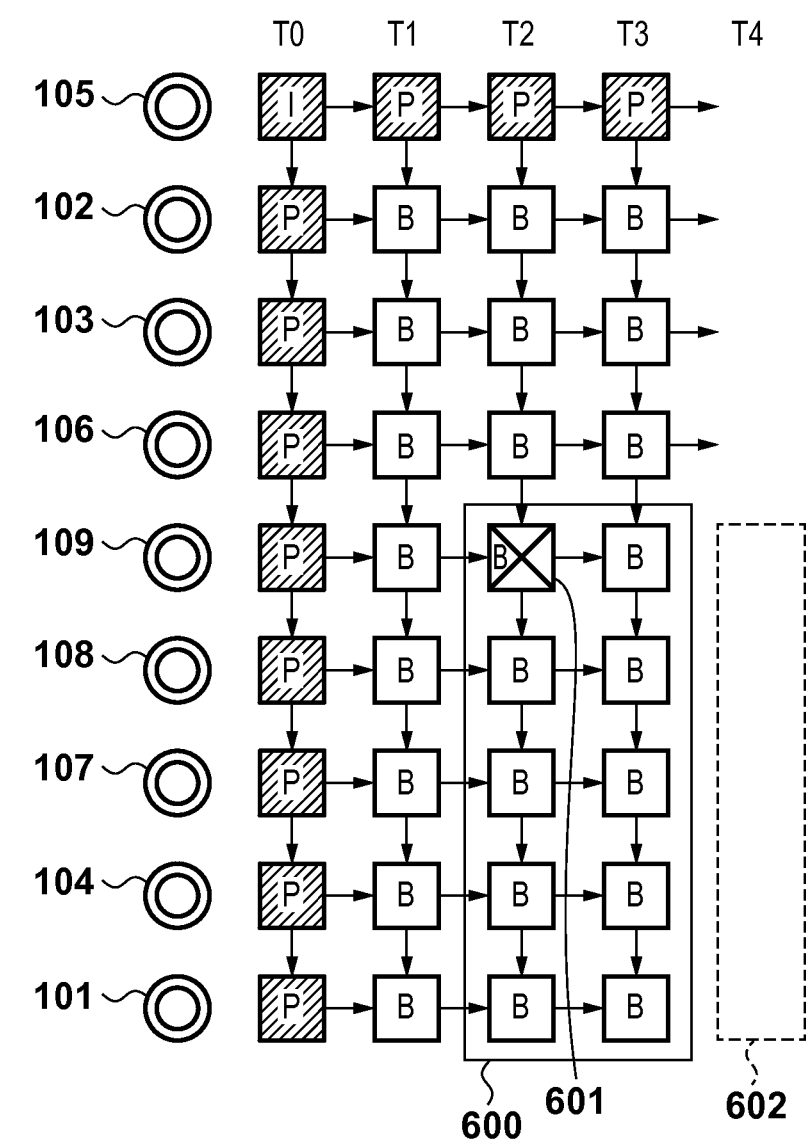
FIG. 6 is a view exemplifying the reference map when a negative acknowledgement is received from a reception apparatus.

FIG. 6 is a view exemplifying the reference map when a negative acknowledgement is received from the reception apparatus for decoding encoded video data. By way of example, FIG. 6 shows the reference map 413 when the imaging unit 109 captures an image at the time T2 and a negative acknowledgement for an encoded B frame 601 is received at the time T4. In this example, the negative acknowledgement analysis unit 412 specifies the B frame 601 (encoding unit region) by analyzing video data which could not be decoded and is included in the negative acknowledgement. Furthermore, based on the reference direction of the reference map 413, the unit 412 specifies frames which have been encoded by setting the B frame 601 (encoding unit region) as a reference start point. A frame group 600 (error encoding region) surrounded by solid lines corresponds to the frames, to which an error may propagate. The negative acknowledgement analysis unit 412 changes the reference relationship between the frames of the reference map 413 so that reference from the frame group 600 (error encoding region) cannot be made when encoding an encoding unit region after the error encoding region. More specifically, the negative acknowledgement analysis unit 412 deletes, from the reference map 413, a frame group (a reference direction group 602 surrounded by broken lines) to be referred to when encoding the video data. For the imaging units 109, 108, 107, 104, and 101 at the time T4, B frames are changed to P frames so that encoding by only parallax compensation is performed without performing encoding by motion compensation. As described above, the negative acknowledgement analysis unit 412 controls to encode an encoding unit region so that the decoding apparatus can decode it without using a specific encoding unit region. For example, the unit 412 controls to encode an encoding unit region so that the decoding apparatus can decode it without using an encoding unit region indicated by a negative acknowledgement.

The encoding mode determination unit 401 recognizes based on the changed reference map 413 that it is impossible to perform encoding by motion compensation for the imaging units 109, 108, 107, 104, and 101 at the time T4, and switches to encoding by only parallax compensation.

Figure 7:
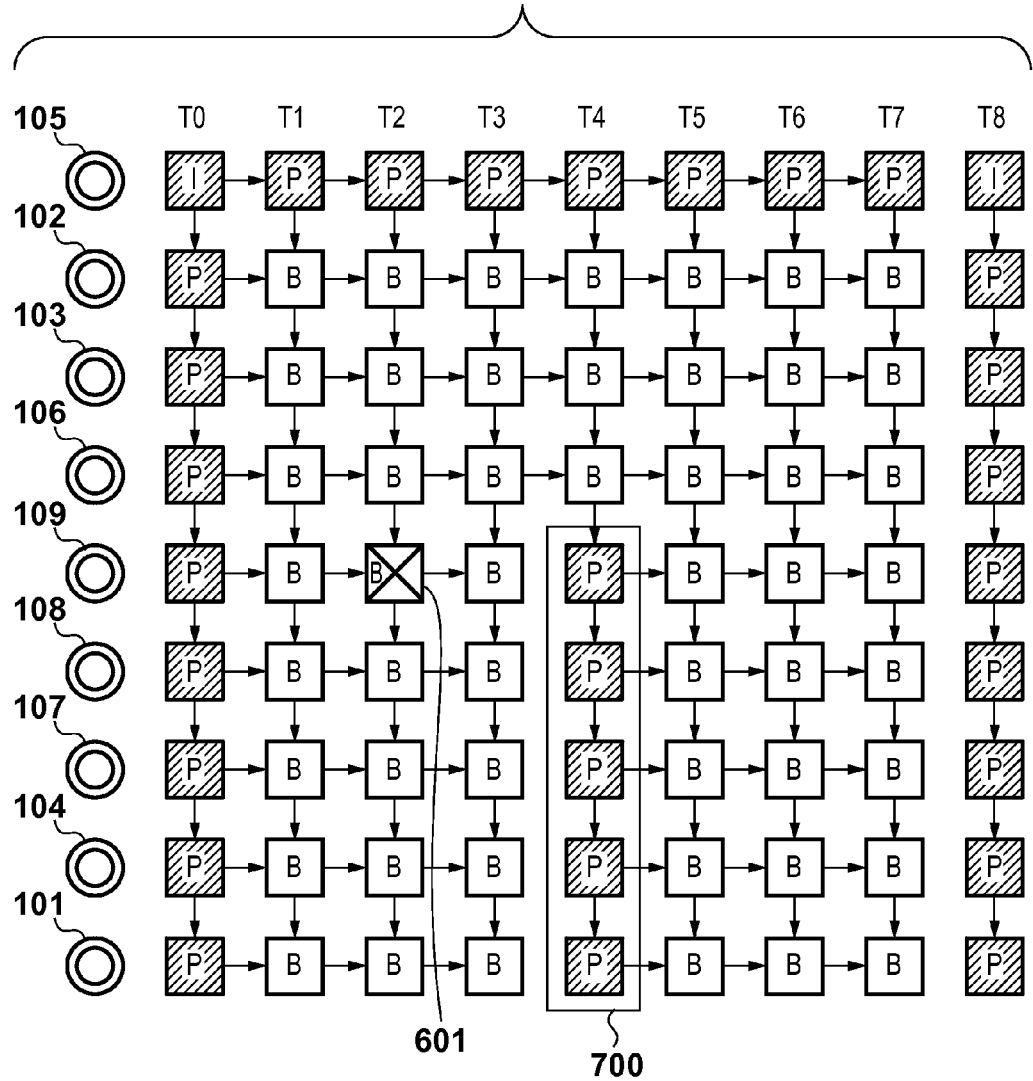
FIG. 7 is a view showing an example of update of the reference map based on a negative acknowledgement.

FIG. 7 is a view showing an example of update of the reference map based on a negative acknowledgement. FIG. 7 shows an encoded state after updating the reference map 413 at the time T4. For a frame group 700, reference in the time direction by the B frames of the imaging units 109, 108, 107, 104, and 101 at the time T4 is deleted, and encoding is performed by reference in only the parallax direction by inserting P frames.

Figure 8:
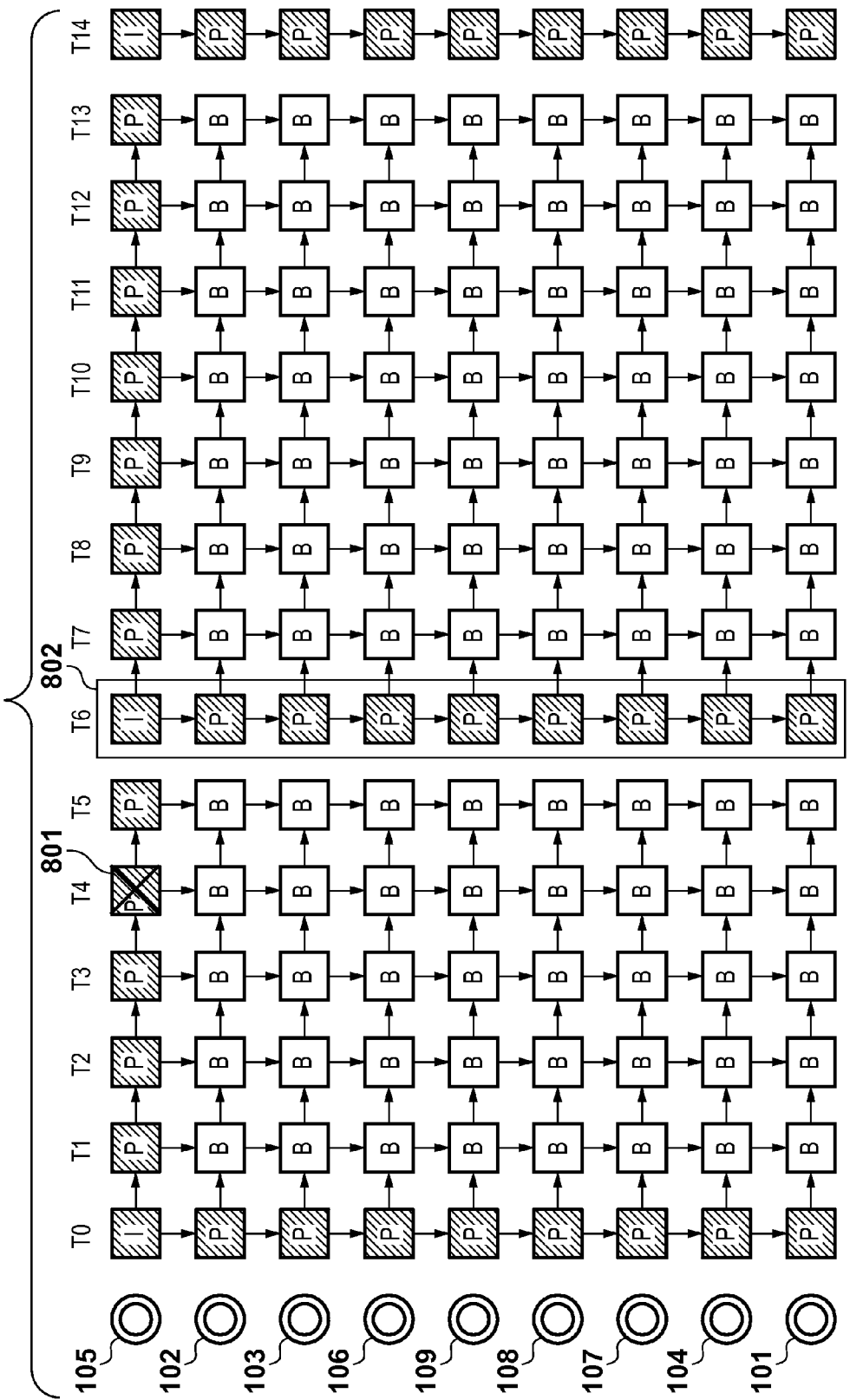
FIG. 8 is a view showing an example of insertion of an intra-frame based on a negative acknowledgement.

FIG. 8 is a view showing an example of insertion of an intra-frame based on a negative acknowledgement. As a case in which it is impossible to decode video data at the basic viewpoint due to an error, FIG. 8 shows an example in which the imaging unit 105 captures an image at the time T4, and the reference map 413 is changed upon receiving a negative acknowledgement for an encoded P frame 801 at the time T6.

At the time T6, the negative acknowledgement analysis unit 412 receives the negative acknowledgement for the video frame at the basic viewpoint at the time T4, and specifies the P frame 801 (encoding unit region) by analyzing video data which could not be decoded and is included in the negative acknowledgement. Furthermore, based on the reference direction of the reference map 413, the unit 412 specifies frames which have been encoded by setting the P frame 801 (encoding unit region) as a reference start point. In this case, an error may propagate to a frame group (an error encoding region) of all frames at the time T4 and T5.

The negative acknowledgement analysis unit 412 changes the reference relationship between the frames of the reference map 413 so that reference from the error encoding region cannot be made when encoding an encoding unit region after the error encoding region. In FIG. 8, all reference in the time direction is deleted for a video frame group 802 in encoding at the time T6 so that encoding unit regions encoded until the time T5 are not referred to. The frame of the video data at the basic viewpoint at the time T6 can undergo neither motion compensation nor parallax compensation, and is thus encoded as an intra-frame (I frame) by intra-prediction. Furthermore, video frames at non-basic viewpoints at the time T6 are sequentially referred to in the parallax direction by starting with the video at the basic viewpoint, and encoded as inter-frames (P frames) by parallax compensation. As described above, if the first encoding unit region included in the video data captured by the predetermined first imaging unit is encoded without referring to another encoding unit region, the negative acknowledgement analysis unit 412 controls encoding as follows. That is, the negative acknowledgement analysis unit 412 controls to encode an encoding unit region captured by the second imaging unit at an image capturing time corresponding to that of the first encoding unit region without referring to another encoding unit region captured by the second imaging unit.

The insertion cycle of an intra-frame (I frame) is arbitrarily settable. If the insertion cycle is set to 8 frames, the next intra-frame is inserted 8 frames after the last intra-frame is inserted (FIG. 7). That is, if the intra-frame (I frame) is inserted at the time T6, the next intra-frame is inserted at the time T14 (FIG. 8). Note that although the reference map in which an intra-frame (I frame) is periodically inserted has been exemplified in this embodiment, the present invention is not limited to this. It is not necessary to periodically insert an intra-frame as long as insertion of a redundant intra-frame can be restricted.

Figure 9:
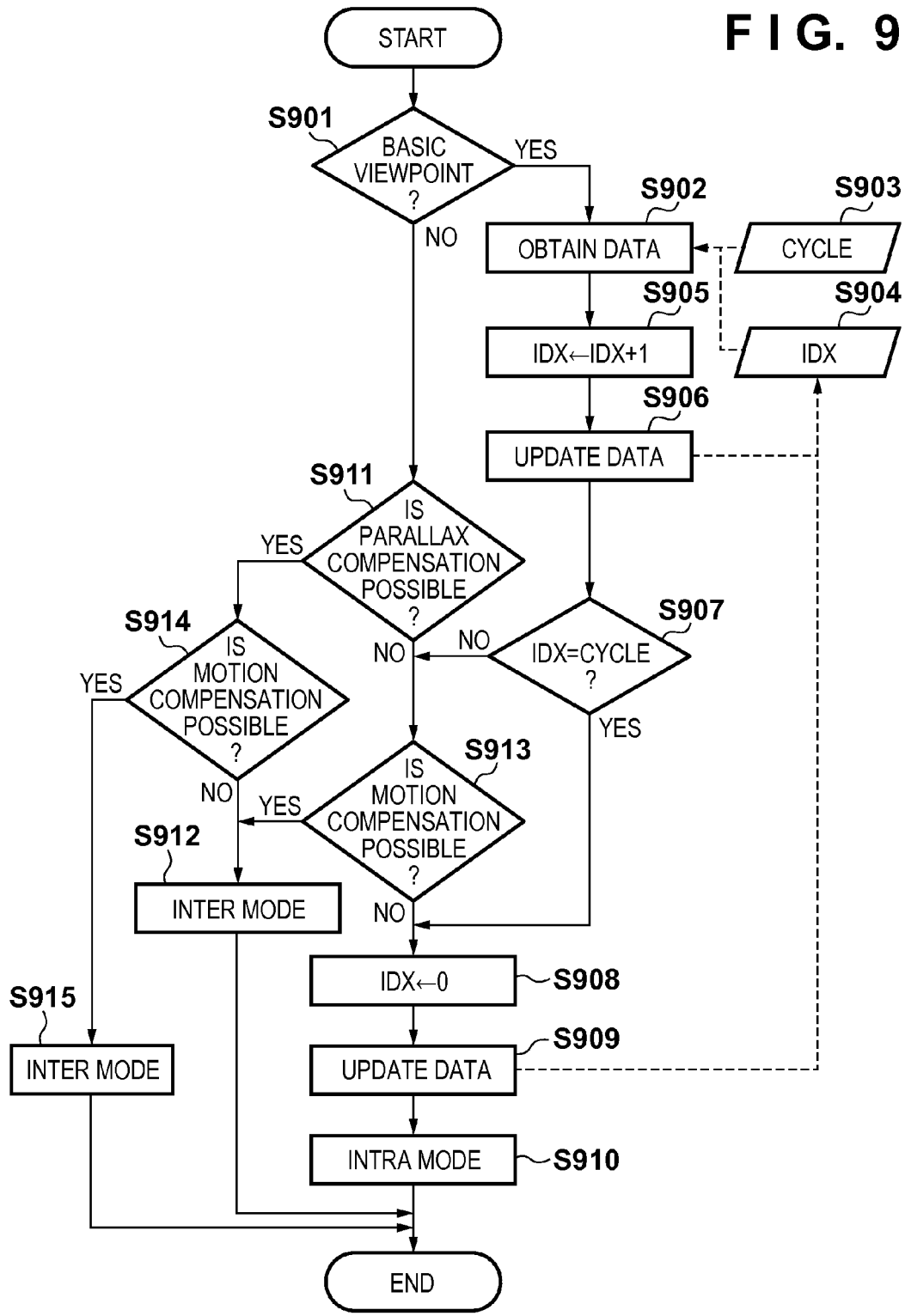
FIG. 9 is a flowchart for explaining the procedure of determination processing by an encoding mode determination unit.

The procedure of encoding mode determination processing by the encoding mode determination unit 401 will be described with reference to FIG. 9.

In step S901, the encoding mode determination unit 401 determines whether video data input from the imaging data is video data at the basic viewpoint. For example, the encoding mode determination unit 401 can use identification information set for each of the plurality of viewpoint positions (imaging units) to determine whether the video data is video data at the basic viewpoint. If the input video data is video data at the basic viewpoint (YES in step S901), the encoding mode determination unit 401 obtains an intra-frame insertion cycle S903 and a frame index (IDX) S904 in step S902.

The frame index is incremented in step S905, and updated in step S906. In step S907, the encoding mode determination unit 401 determines whether the frame index coincides with the intra-frame insertion cycle. If the frame index coincides with the insertion cycle (YES in step S907), the encoding mode determination unit 401 initializes the frame index to 0 in step S908.

In step S909, the encoding mode determination unit 401 updates the frame index again. In step S910, the encoding mode determination unit 401 determines the intra mode.

On the other hand, if it is determined in step S907 that the frame index does not coincide with the insertion cycle (NO in step S907), in step S913 the encoding mode determination unit 401 determines, based on the reference map 413, whether motion compensation is possible. If motion compensation is possible (YES in step S913), the encoding mode determination unit 401 determines the inter mode in step S912. On the other hand, if motion compensation is impossible (NO in step S913), the encoding mode determination unit 401 initializes the frame index (step S908), and updates the frame index again (step S909). In step S910, the encoding mode determination unit 401 determines the intra mode.

Alternatively, if it is determined in step S901 that the video data input by the imaging unit is video data at a non-basic viewpoint (NO in step S901), the encoding mode determination unit 401 determines whether parallax compensation is possible (step S911). If parallax compensation is possible (YES in step S911), the process advances to step S914. In step S914, the encoding mode determination unit 401 determines whether motion compensation is possible. If motion compensation is possible (YES in step S914), the encoding mode determination unit 401 determines the inter mode by parallax compensation and motion compensation (YES in step S914, step S915).

If it is determined in step S914 that motion compensation is impossible (NO in step S914), the encoding mode determination unit 401 determines the inter mode by parallax compensation (NO in step S914, step S912).

If it is determined in step S911 that parallax compensation is impossible (NO in step S911), the process advances to step S913, and the encoding mode determination unit 401 determines whether motion compensation is possible. If motion compensation is possible (YES in step S913), the encoding mode determination unit 401 determines the inter mode by motion compensation (YES in step S913, step S912).

If both parallax compensation and motion compensation are impossible (NO in step S911, NO in step S913), the encoding mode determination unit 401 initializes the frame index (step S908), and updates it again (step S909). In step S910, the encoding mode determination unit 401 determines the intra mode.

In this embodiment, the arrangement and processing of each component have been explained by assuming that all images captured by the imaging units 101 to 109 are color videos. Some or all of the videos captured by the imaging units 101 to 109, however, may be changed to monochrome videos. In this case, the color filter 308 shown in FIG. 3 can be omitted from the arrangement of the imaging unit.

Furthermore, in this embodiment, the arrangement and processing of each component have been described by assuming a multi-view camera which includes a plurality of imaging units in one single image capturing apparatus. The present invention, however, is not limited to this. An imaging unit may use one or a plurality of image capturing apparatuses. This embodiment is not limited to the arrangement of the image capturing apparatus, and is applicable to an encoding apparatus which encodes multi-viewpoint video data captured by an imaging unit at a plurality of viewpoint positions.

According to the present invention, it is possible to provide a multi-viewpoint video data encoding technique which allows early recovery from error propagation. Alternatively, it is possible to provide a multi-viewpoint video data encoding technique which enables to reduce the transmission data amount.

[Second Embodiment]

In the first embodiment, there has been described the arrangement in which the encoding mode of video data and a reference direction in encoding are dynamically controlled (changed) based on a negative acknowledgement sent from the reception apparatus which decodes encoded video data.

In this embodiment, an arrangement will be explained in which information of a video data packet which could not be transmitted on the transmission apparatus side and a negative acknowledgement packet received from a reception apparatus are used together to change a reference map 413. Processing when there exists a video data packet which could not be transmitted by the transmission apparatus because of a frame skip due to communication band limitations or transmission buffer overflow in a communication module 213 of the transmission apparatus will be described.

Figure 10:
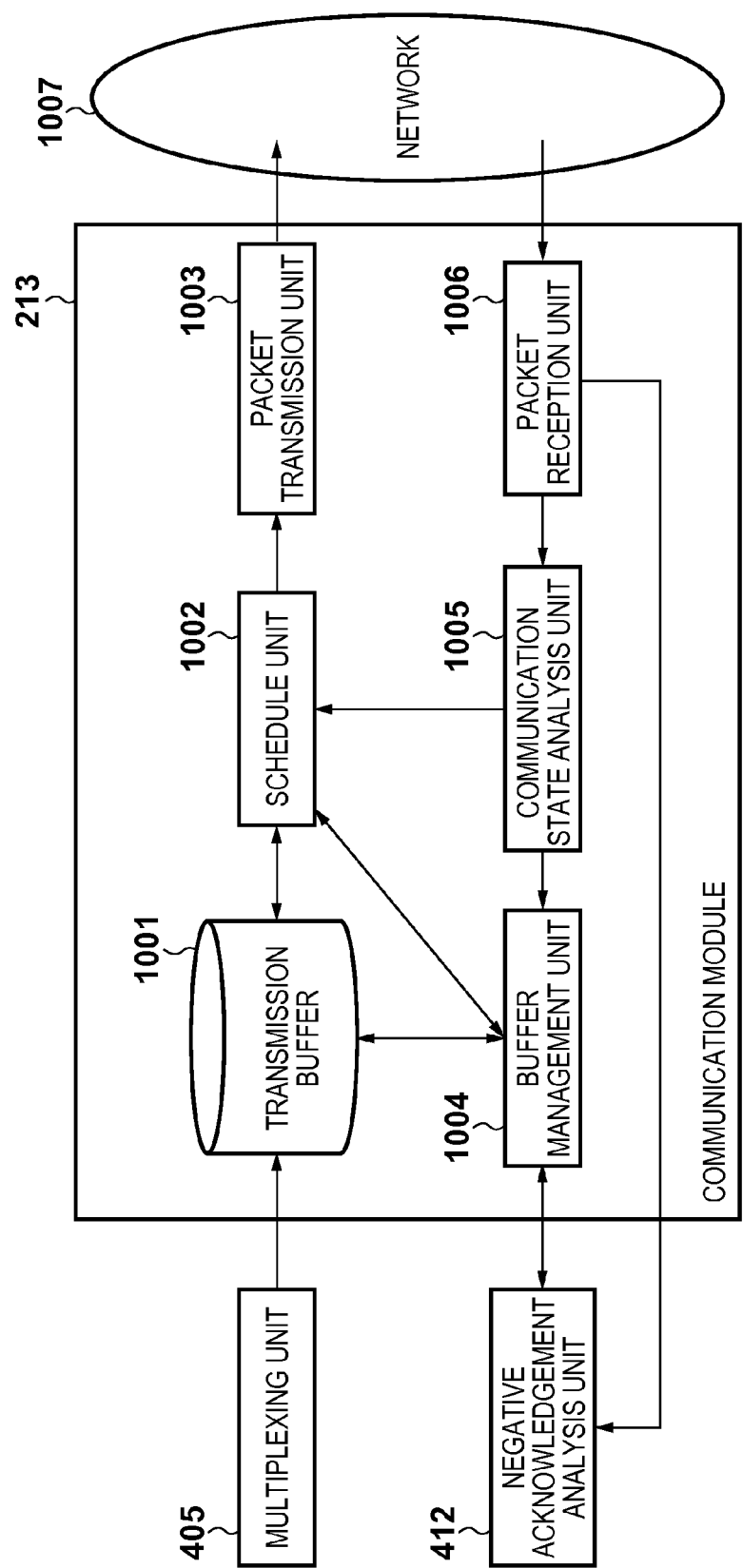
FIG. 10 is a block diagram exemplifying the internal arrangement of a communication module.

FIG. 10 is a view exemplifying the internal arrangement of the communication module 213 according to the embodiment. Video data packets packetized by a multiplexing unit 405 as a component of an encoder unit 210 shown in FIG. 4 are stored in a transmission buffer 1001. Although the transmission buffer 1001 is integrated in the communication module 213 in the embodiment, a RAM 202 outside the communication module 213 may be used to store the video data packets.

A schedule unit 1002 decides a packet transmission interval based on a communication state analyzed by a communication state analysis unit 1005, and inputs the video data packets to a packet transmission unit 1003 at the determined transmission intervals. Depending on the communication state, the schedule unit 1002 may transmit not all of the stored video data packets, and skip transmission of a specific frame packet to discard it from the transmission buffer 1001.

The packet transmission unit 1003 transmits the video data packet input by the schedule unit 1002 to the reception apparatus via a network 1007. Furthermore, in addition to the video data packet, the packet transmission unit 1003 can transmit an ICMP (Internet Control Message Protocol, RFC 792, IETF) echo request packet to analyze the communication state. The packet transmission unit 1003 can also transmit the RTCP (RTP Control Protocol) SR (Sender Report) for media synchronization to the reception apparatus.

A packet reception unit 1006 receives a packet sent from the reception apparatus via the network 1007, and decodes it. The packet received from the reception apparatus includes the RTCP RR (Receiver Report) and a negative acknowledgement for video data which could not be decoded in the reception apparatus. The RTCP RR (Receiver Report) includes the error rate and jitter information of the network, and is input to the communication state analysis unit 1005 to be used for analysis of the communication state.

As a video data negative acknowledgement method, there is provided, for example, "RTP Payload Formats to Enable Multiple Selective Retransmissions, IETF". Note that the negative acknowledgement method is not limited to this, and other methods may be used. Details of the format and the like of a negative acknowledgement packet will be omitted since they are not an essential element of the present invention. The negative acknowledgement packet received by the packet reception unit 1006 is input to a negative acknowledgement analysis unit 412. Processing of controlling the encoding mode of video data and a reference direction in encoding by changing the reference map 413 based on the negative acknowledgement packet input to the negative acknowledgement analysis unit 412 is the same as that in the first embodiment.

The communication state analysis unit 1005 obtains information such as the error rate and RTT (Round Trip Time) of the network from the RTCP RR (Receiver Report) and ICMP echo response packet input by the packet reception unit 1006. The communication state analysis unit 1005 analyzes the communication state by, for example, calculating the communication band. As a communication band calculation method, for example, TFRC (TCP Friendly Rate Control, RFC 3448, IETF) can be used. Note that the communication calculation method is not limited to this, and other methods may be used. Information of the analysis result of the communication state analysis unit 1005 is sent to the schedule unit 1002, and used for calculation of a packet transmission rate and determination of a frame skip. The information of the analysis result of the communication state analysis unit 1005 is also input to a buffer management unit 1004. The buffer management unit 1004 uses the information of the analysis result of the communication state analysis unit 1005 to, for example, manage and control the buffering time and buffer size of the transmission buffer 1001.

The buffer management unit 1004 inputs, to the negative acknowledgement analysis unit 412, information of a packet which has been discarded because of buffer overflow of the transmission buffer 1001 of the video data packets or a frame skip due to the transmission interval of the schedule unit 1002.

The negative acknowledgement analysis unit 412 changes the reference map 413 using not only the negative acknowledgement packet received from the reception apparatus but also the information of the video data packet which could not be transmitted on the transmission apparatus side. For example, the negative acknowledgement analysis unit 412 specifies the position of a transmission error frame (transmission error encoding region) in the reference map based on frame identification information included in the information of the video data packet input by the buffer management unit 1004. The negative acknowledgement analysis unit 412 generates error information for changing the reference relationship between frames so that reference from the transmission error frame (transmission error encoding region) cannot be made when encoding the video data later. The negative acknowledgement analysis unit 412 controls to encode an encoding unit region so that a decoding apparatus can decode it without using any encoding unit region which is not output to the decoding apparatus.

By using, to change the reference map 413, the information of the video data packet which could not be transmitted on the transmission apparatus side, it is possible to shorten the time to recover from the influence of error propagation and video disturbance in the reception apparatus.

In this embodiment, the arrangement in which the information of the video data packet which could not be transmitted on the transmission apparatus side and the negative acknowledgement packet received from the reception apparatus are used together to change the reference map 413 has been described. Note that the invention associated with this embodiment is also applicable to an embodiment in which the reference map 413 is changed using only the information of the video data packet that could not be transmitted on the transmission apparatus side.

According to the present invention, it is possible to provide a multi-viewpoint video data encoding technique which allows early recovery from error propagation. Alternatively, it is possible to provide a multi-viewpoint video data encoding technique which enables to reduce the transmission data amount.

[Third Embodiment]

A case in which a transmission apparatus has a retransmission function will be described in this embodiment. The retransmission function is a function of retransmitting a corresponding video data packet from the transmission apparatus to a reception apparatus in response to a negative acknowledgement from the reception apparatus.

The retransmission function of the transmission apparatus will be explained with reference to FIG. 10. Upon receiving a negative acknowledgement packet from the reception apparatus, a packet reception unit 1006 shown in FIG. 10 inputs it to a negative acknowledgement analysis unit 412. The negative acknowledgement analysis unit 412 obtains, in advance, the buffering time of a reception packet in the reception apparatus from a communication module 213. The buffering time is a time from when the reception apparatus receives a video data packet (encoded video data packet) until decoding starts. The communication module 213 obtains the buffering time from the reception apparatus, and inputs it to the negative acknowledgement analysis unit 412.

As a method of obtaining the buffering time, for example, a method of using RTSP (Real Time Streaming Protocol, RFC 2326, IETF) can be used. The reception apparatus may notify the transmission apparatus of the buffering time using the RTSP SET_PARAMETER method. The transmission apparatus may obtain the buffering time of the reception apparatus using the GET_PARAMETER method. The method of obtaining the buffering time is not limited to them, and other methods which do not use RTSP parameters may be adopted.

The communication module 213 has a timer for measuring a response time from when a packet transmission unit 1003 transmits a video data packet until the packet reception unit 1006 receives a negative acknowledgement packet transmitted from the reception apparatus.

The negative acknowledgement analysis unit 412 obtains, from the communication module 213, an RTT (Round Trip Time) analyzed by a communication state analysis unit 1005 and the response time measured by the timer. Based on the obtained RTT, the negative acknowledgement analysis unit 412 calculates a retransmission time necessary for retransmission of the packet from the transmission apparatus to the reception apparatus. The negative acknowledgement analysis unit 412 determines that retransmission is possible if the total time of the calculated time and the response time until the negative acknowledgement is received is equal to or shorter than the buffering time of the reception apparatus, and outputs a retransmission request of the video data packet which could not be decoded. In response to reception of a negative acknowledgement, it is determined whether to retransmit an encoding unit region which was not decoded by a decoding apparatus.

As a retransmission request, the negative acknowledgement analysis unit 412 inquires of a buffer management unit 1004 whether there exists, in a transmission buffer 1001, a video data packet for which it has been determined that retransmission is done before the start of decoding. If there exists in the transmission buffer 1001 a video data packet which could not be decoded, the buffer management unit 1004 requests a schedule unit 1002 to retransmit the video data packet existing in the transmission buffer 1001. In response to the request from the buffer management unit 1004, the schedule unit 1002 schedules packet retransmission, thereby inputting the corresponding video data packet from the transmission buffer 1001 to the packet transmission unit 1003. The packet transmission unit 1003 retransmits, to the reception apparatus, the video data packet input by the schedule unit 1002.

If it is determined that retransmission of the video data packet is possible, the negative acknowledgement analysis unit 412 generates no error information for the negative acknowledgement and makes no change to a reference map 413. As described above, if it is determined that an encoding unit region which was not decoded is not to be retransmitted, the negative acknowledgement analysis unit 412 controls to encode an encoding unit region so that the decoding apparatus can decode it without using the encoding unit region which was not decoded. In this case, it is possible to realize more efficient encoding without imposing limitations on the reference direction in encoding multi-viewpoint video data.

As a modification of the embodiment, even if it is determined that retransmission is possible, the negative acknowledgement analysis unit 412 can generate error information to change the reference map 413 by making settings for the negative acknowledgement analysis unit 412 in advance. In this case, it is possible to reduce the risk of error propagation when a retransmitted video data packet cannot be decoded in the reception apparatus due to the change to the reference map 413.

As described above, according to the above embodiment, an encoding unit region where an error has occurred and encoding unit regions which have been encoded by setting the encoding unit region as a reference start point are specified as an error encoding region in the reference map. The relationship between encoding unit regions is changed to update the reference map so that reference from the error encoding region cannot be made when encoding an encoding unit region after the error encoding region. Performing encoding according to the updated reference map allows early recovery from error propagation. Alternatively, since performing encoding according to the updated reference map enables to perform encoding not to insert a redundant intra-frame, it becomes possible to reduce the transmission data amount.

According to the present invention, it is possible to provide a multi-viewpoint video data encoding technique which allows early recovery from error propagation. Alternatively, it is possible to provide a multi-viewpoint video data encoding technique which enables to reduce the transmission data amount.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-122396, filed May 29, 2012, which is hereby incorporated by reference herein in its entirety.

What is claimed is:

1. An encoding apparatus for encoding video data captured by a plurality of imaging units by a data unit, comprising:
   an encoder configured to perform inter-encoding for encoding, according to a predetermined reference relationship including (i) a reference relationship between data units each for which an image has been captured at a different image capturing time, and (ii) a reference relationship between data units each for which an image has been captured by a different imaging unit, a data unit to be encoded by referring to data units included in the predetermined reference relationship;
   an output processor configured to output the data unit encoded by the encoder to a decoding apparatus;
   a receiver configured to receive, from the decoding apparatus, error information indicating an error data unit which was not decoded by the decoding apparatus; and
   a controller configured to (iii) specify, based on the predetermined reference relationship, a data unit group, which has not been encoded, to which an error may propagate in a state where the error data unit indicated by the error information cannot be decoded, in a case where the error information is received by the receiver and (iv) change the inter-encoding by the encoder so that the data unit group is encoded based on a reference relationship being different from the predetermined reference relationship without referring to the error data unit and a data unit to which the error has propagated and the encoding has been performed.

2. The apparatus according to claim 1, wherein the controller controls the encoder to encode the data unit so that the decoding apparatus is capable of decoding the data unit output from the output processor without using the error data unit indicated by the error information.

3. The apparatus according to claim 1, wherein the controller controls the encoder to encode the data unit so that the decoding apparatus is capable of decoding the data unit output from the output processor without using the error data unit which is not output from the output processor to the decoding apparatus.

4. The apparatus according to claim 1, further comprising:
   a determination processor configured to determine, in response to reception of the error information, whether to retransmit the error data unit which was not decoded by the decoding apparatus,
   wherein if the error information is received by the receiver and the determination processor determines not to retransmit the error data unit which was not decoded, the controller changes the inter-encoding by the encoder so that the data unit group is encoded based on the reference relationship being different from the predetermined reference relationship without referring to the error data unit and the data unit to which the error has propagated and the encoding has been performed.

5. The apparatus according to claim 1, wherein the encoder performs, in a predetermined cycle, a process of encoding a data unit included in video data captured by a predetermined imaging unit of the plurality of imaging units without referring to another data unit.

6. The apparatus according to claim 1, wherein the encoder performs inter-encoding for encoding at least one of (v) remainder data obtained by subtracting, from a first data unit which is captured by a first imaging unit at a first time, a prediction signal generated by a data unit which is captured by the first imaging unit at a time different from the first time and (vi) remainder data obtained by subtracting, from the first data unit, a prediction signal generated by a second data unit which is captured by a second imaging unit different from the first imaging unit at the first time,
   wherein the controller controls the inter-encoding to be performed by the encoder based on the error information and a result of the inter-encoding by the encoder, and
   wherein in a case where the error information indicates that the first data unit was not decoded and in a case where a third data unit which is captured by a third imaging unit different from the first imaging unit is encoded by the inter-encoding based on a prediction signal generated by the first data unit, the controller changes the inter-encoding to be performed by the encoder so as not to perform the inter-encoding for a fourth data unit which is captured by the third imaging unit at a second time after a time at which the third data unit was captured by the third imaging unit, based on a prediction signal generated by a data unit which is captured by the third imaging unit before capturing the fourth data unit.

7. The apparatus according to claim 6, wherein in a case where the error information indicates that the first data unit was not decoded and in a case where a second data unit which is captured by a second imaging unit is not encoded by the inter-encoding based on the prediction signal generated by the first data unit, the controller controls the encoder so as to perform the inter-encoding for a fifth data unit, after the second data unit, which is captured by the second imaging unit at the second time, based on a prediction signal generated by a data unit which is captured by the second imaging unit before capturing the fifth data unit.

8. The apparatus according to claim 6, wherein the controller determines which of (i) first remainder data obtained by subtracting, from a first data unit which is captured by a first imaging unit at a first time, a prediction signal generated by a data unit which is captured by the first imaging unit at a time different from the first time and (ii) second remainder data obtained by subtracting, from the first data unit, a prediction signal generated by a second data unit which is captured by a second imaging unit different from the first imaging unit at the first time is encoded based on a size of the first remainder data and a size of the second remainder data.

9. The apparatus according to claim 1, wherein in a case where the error information is received by the receiver, the controller controls the encoder so that the data unit group is encoded by referring to a number of data units smaller than a number of data units being referred to in a case where the error information is not received by the receiver.

10. The apparatus according to claim 1, wherein in a case where the error information is not received by the receiver,
the controller controls the encoder based on the predetermined reference relationship so that a first data unit is captured by a first imaging unit in the plurality of imaging units, a second data unit is captured by the first imaging unit at a time before an image capturing time of the first data unit, a third data unit is captured at a same time as an image capturing time of the first data unit by an imaging unit other than the first imaging unit, and the first data unit is encoded by referring to the second data unit and the third data unit, and
wherein in a case where the error information is received by the receiver,
the controller controls the encoder based on the reference relationship being different from the predetermined reference relationship so that the first data unit is encoded by referring to the third data unit without referring to the second data unit.

11. An encoding method of encoding video data captured by a plurality of imaging units by a data unit, comprising:
an encoding step of performing inter-encoding for encoding, according to a predetermined reference relationship including (i) a reference relationship between data units each for which an image has been captured at a different image capturing time, and (ii) a reference relationship between data units each for which an image has been captured by a different imaging unit, a data unit to be encoded by referring to data units included in the predetermined reference relationship;
an output step of outputting the data unit encoded in the encoding step to a decoding apparatus;
a reception step of receiving, from the decoding apparatus, error information indicating an error data unit which was not decoded by the decoding apparatus; and
a control step of (iii) specifying, based on the predetermined reference relationship, a data unit group, which has not been encoded, to which an error may propagate in a state where the error data unit indicated by the error information cannot be decoded, in a case where the error information is received by the receiver and (iv) changing the inter-encoding in the encoding step so that the data unit group is encoded based on a reference relationship being different from the predetermined reference relationship without referring to the error data unit and a data unit to which the error has propagated and the encoding has been performed.

12. The method according to claim 11, wherein in the control step, the data unit is encoded so that the decoding apparatus is capable of decoding the data unit without using the error data unit indicated by the error information.

13. The method according to claim 11, wherein in the control step, the data unit is encoded so that the decoding apparatus is capable of decoding the data unit without using the error data unit which is not output to the decoding apparatus.

14. The method according to claim 11, further comprising
a determination step of determining, in response to reception of the error information, whether to retransmit the error data unit which was not decoded by the decoding apparatus,
wherein if the error information is received in the reception step and it is determined in the determination step not to retransmit the error data unit which was not decoded, the control step changes the inter-encoding in the encoding step so that the data unit group is encoded based on the reference relationship being different from the predetermined reference relationship without referring to the error data unit and the data unit to which the error has propagated and the encoding has been performed.

15. A non-transitory computer-readable storage medium containing computer-executable instructions that control an encoding apparatus for encoding video data captured by a plurality of imaging units by a data unit, the medium comprising:
computer-executable instructions that perform inter-encoding for encoding, according to a predetermined reference relationship including (i) a reference relationship between data units each for which an image has been captured at a different image capturing time, and (ii) a reference relationship between data units each for which an image has been captured by a different imaging unit, a data unit to be encoded by referring to data units included in the predetermined reference relationship;
computer-executable instructions that output the data unit encoded by the computer-executable instructions that perform inter-encoding to a decoding apparatus;
computer-executable instructions that receive, from the decoding apparatus, error information indicating an error data unit which was not decoded by the decoding apparatus; and
computer-executable instructions that (iii) specify, based on the predetermined reference relationship, a data unit group, which has not been encoded, to which an error may propagate in a state where the error data unit indicated by the error information cannot be decoded, in a case where the error information is received by the receiver, and (iv) change the inter-encoding by the computer-executable instructions so that the data unit group is encoded based on a reference relationship being different from the predetermined reference relationship without referring to the error data unit and a data unit to which the error has propagated and the encoding has been performed.

16. The non-transitory computer-readable storage medium according to claim 15, further comprising:
   computer-executable instructions that encode the data unit so that the decoding apparatus is capable of decoding the data unit without using the error data unit indicated by the error information.

17. The non-transitory computer-readable storage medium according to claim 15, further comprising:
   computer-executable instructions that encode the data unit so that the decoding apparatus is capable of decoding the error data unit without using the data unit which is not output to the decoding apparatus.

\* \* \* \* \*